United States Patent
Jang et al.

(10) Patent No.: US 8,588,183 B2
(45) Date of Patent: Nov. 19, 2013

(54) ACCESS ROUTER AND METHOD OF PROCESSING HANDOVER BY ACCESS ROUTER

(75) Inventors: Hee Jin Jang, Yongin-si (KR); Boung-Joon Lee, Seongnam-si (KR); Su Won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 906 days.

(21) Appl. No.: 11/935,613

(22) Filed: Nov. 6, 2007

(65) Prior Publication Data

US 2008/0225800 A1 Sep. 18, 2008

(30) Foreign Application Priority Data

Mar. 16, 2007 (KR) .................. 10-2007-0026337

(51) Int. Cl.
*H04W 4/00* (2009.01)
*H04W 36/00* (2009.01)

(52) U.S. Cl.
USPC .......................................... 370/332; 455/438

(58) Field of Classification Search
None
See application file for complete search history.

(56) References Cited

U.S. PATENT DOCUMENTS

| 6,832,087 | B2* | 12/2004 | Gwon et al. ................... 455/436 |
| 2002/0059433 | A1 | 5/2002 | Oh |
| 2003/0104814 | A1* | 6/2003 | Gwon et al. ................... 455/436 |
| 2003/0212764 | A1* | 11/2003 | Trossen et al. ................. 709/219 |
| 2004/0264476 | A1* | 12/2004 | Alarcon et al. ........... 370/395.52 |
| 2005/0128969 | A1* | 6/2005 | Lee et al. ....................... 370/313 |
| 2006/0083201 | A1 | 4/2006 | He et al. |
| 2006/0274693 | A1 | 12/2006 | Nikander et al. |
| 2007/0014259 | A1* | 1/2007 | Fajardo et al. ................. 370/331 |
| 2007/0091850 | A1* | 4/2007 | Lee et al. ....................... 370/331 |
| 2008/0130571 | A1* | 6/2008 | Maeda et al. .................. 370/331 |
| 2009/0238193 | A1* | 9/2009 | Nishida et al. ................. 370/401 |

FOREIGN PATENT DOCUMENTS

| EP | 1720267 A1 | 11/2006 |
| JP | 2004-282249 A | 10/2004 |
| JP | 2006-261845 A | 9/2006 |
| KR | 10-2005-0036521 A | 4/2005 |
| KR | 10-2005-0057704 A | 6/2005 |
| KR | 10-2006-0089489 A | 8/2006 |
| KR | 10-2007-0010834 A | 1/2007 |
| KR | 10-0679415 B1 | 1/2007 |
| WO | 98/47302 A2 | 10/1998 |
| WO | 2007/001952 A1 | 1/2007 |

OTHER PUBLICATIONS

European Search Report corresponding to Application No. 07833746.6—1249/2135367, Sep. 1, 2010.
Communication, dated Jun. 19, 2013, issued by the Korean Patent Office in counterpart Korean Application No. 10-2007-0026337.

* cited by examiner

*Primary Examiner* — Chirag Shah
*Assistant Examiner* — Ashley Shivers
(74) *Attorney, Agent, or Firm* — Sughrue Mion, PLLC (57) ABSTRACT

An access router including a module buffering first data to be transmitted to a first mobile station, and transmitting the first data to a second access router when the first mobile station moves to the second access router. Methods of processing a handover by the access router during a handover of the mobile station are also described.

20 Claims, 4 Drawing Sheets

ACCESS ROUTER AND METHOD OF PROCESSING HANDOVER BY ACCESS ROUTER

CROSS-REFERENCE TO RELATED APPLICATION

This application claims priority from Korean Patent Application No. 10-2007-0026337, filed on Mar. 16, 2007, in the Korean Intellectual Property Office, the entire disclosure of which is incorporated herein by reference.

BACKGROUND OF THE INVENTION

1. Field of the Invention

Methods and apparatuses consistent with the present invention relate to mobile data communication. More particularly, the present invention relates to a mobile communication method and apparatus which may reduce loss of data when a mobile station performs a handover.

2. Description of Related Art

Figure 1:
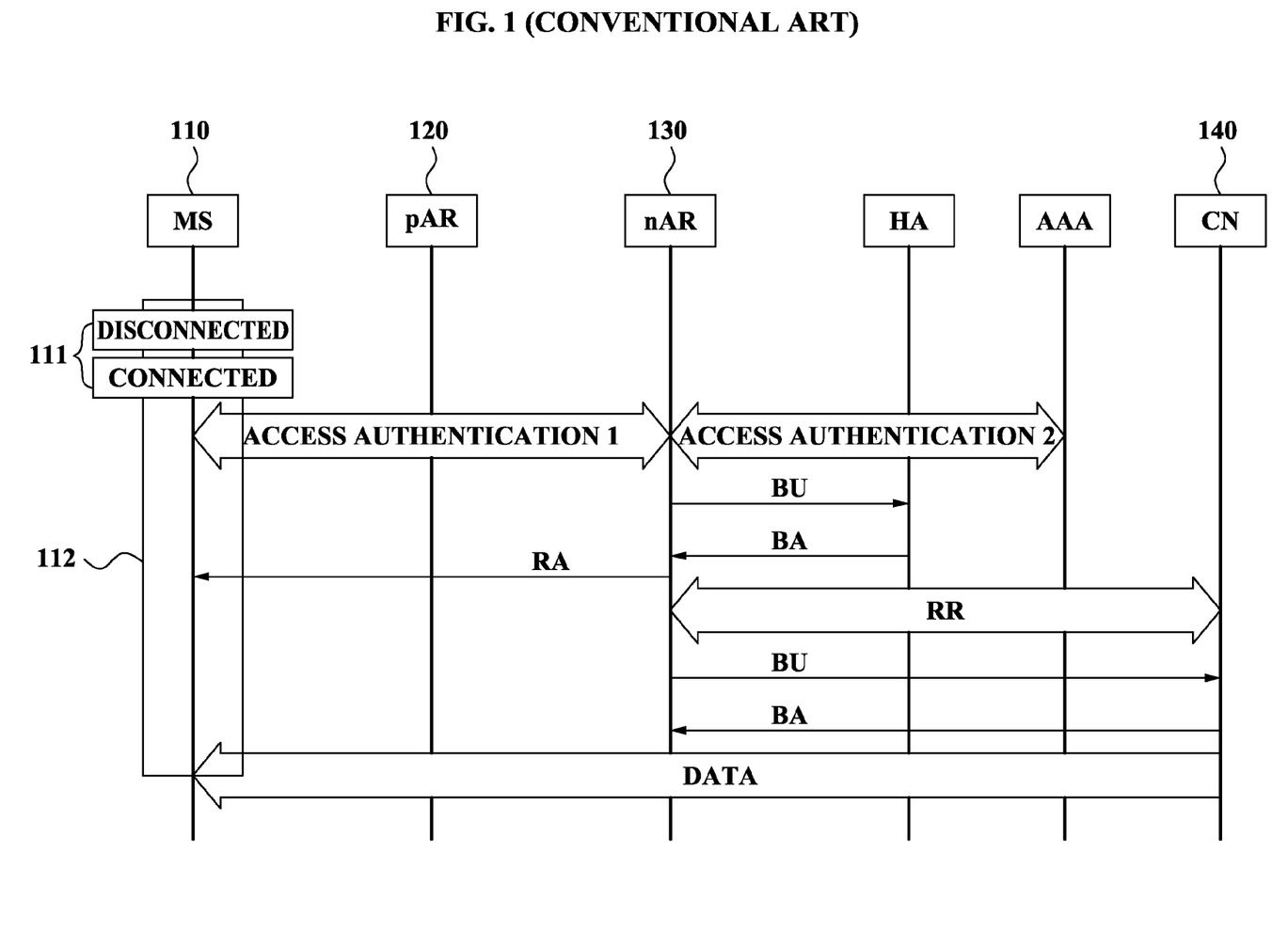
FIG. 1 is a diagram illustrating a handover procedure in Proxy Mobile Internet Protocol version 6 (PMIPv6) in the conventional art.

Since mobile stations constantly move about in and out of different mobile network environments, problems in handover management regularly occur. FIG. 1 is a diagram illustrating a handover procedure in Proxy Mobile Internet Protocol version 6 (PMIPv6) in the conventional art. When a mobile station (MS) 110 moves from a previous access router (pAR) 120 to a new access router (nAR) 130, the MS 110 performs a handover from the pAR 120 to the nAR 130, in operation 111 in FIG. 1. In this instance, only when knowing the nAR 130 where the MS 110 is attached, may a correspondent node (CN) 140 transmit data to the MS 110. Accordingly, during a period 112, data to be transmitted to the MS 110 is lost.

SUMMARY OF THE INVENTION

An aspect of the present invention provides an access router and a method of processing a handover by the access router which may reduce a loss of data whose destination is a mobile station, during a handover of the mobile station.

Another aspect of the present invention also provides an access router and a method of processing a handover by the access router which reduce the latency of a handover, and thereby may perform a fast handover.

Another aspect of the present invention also provides an access router and a method of processing a handover by the access router which may provide a handover capable of reducing a packet loss, even when only changing access routers while still using an existing mobile station.

Another aspect of the present invention also provides an access router and a method of processing a handover by the access router which may provide a handover capable of reducing a packet loss and where predicting movement direction is not required.

Another aspect of the present invention also provides an access router and a method of processing a handover by the access router which simplify an entire handover procedure and thereby may embody a robust communication method and apparatus with a low malfunction rate.

According to an aspect of the present invention, an access router is provided including: a module buffering first data to be transmitted to a first mobile station, and transmitting the first data to a second access router after the first mobile station moves to the second access router.

In an aspect of the present invention, the access router establishes a tunnel with at least one adjacent access router. In an aspect of the present invention, the access router determines all other access routers adjacent to the access router, and establishes a tunnel with at least one access router which is selected from among other access routers adjacent to the access router, based on a location of the first mobile station.

According to another aspect of the present invention, when a prediction is made that the first mobile station will move, the access router transmits the address of the first mobile station to the at least one access router adjacent to the access router.

According to still another aspect of the present invention, when second data is received from a third access router, the access router transmits the second data to a second mobile station, the second data being buffered in the third access router and being data for the second mobile station, the second mobile station performing a handover to the access router. In order to receive the second data, the access router requests the second data buffered in the third access router from the third access router, the second data being data for the second mobile station. The access router identifies the access router requesting the second data, based on (1) the address of the third mobile station, which is received from the third access router, and (2) an address of the second mobile station.

According to yet another aspect of the present invention, a method of processing a handover by an access router, the method including: buffering first data to be transmitted to a first mobile station; and transmitting the first data to a second access router after the first mobile station performs a handover to the second access router.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
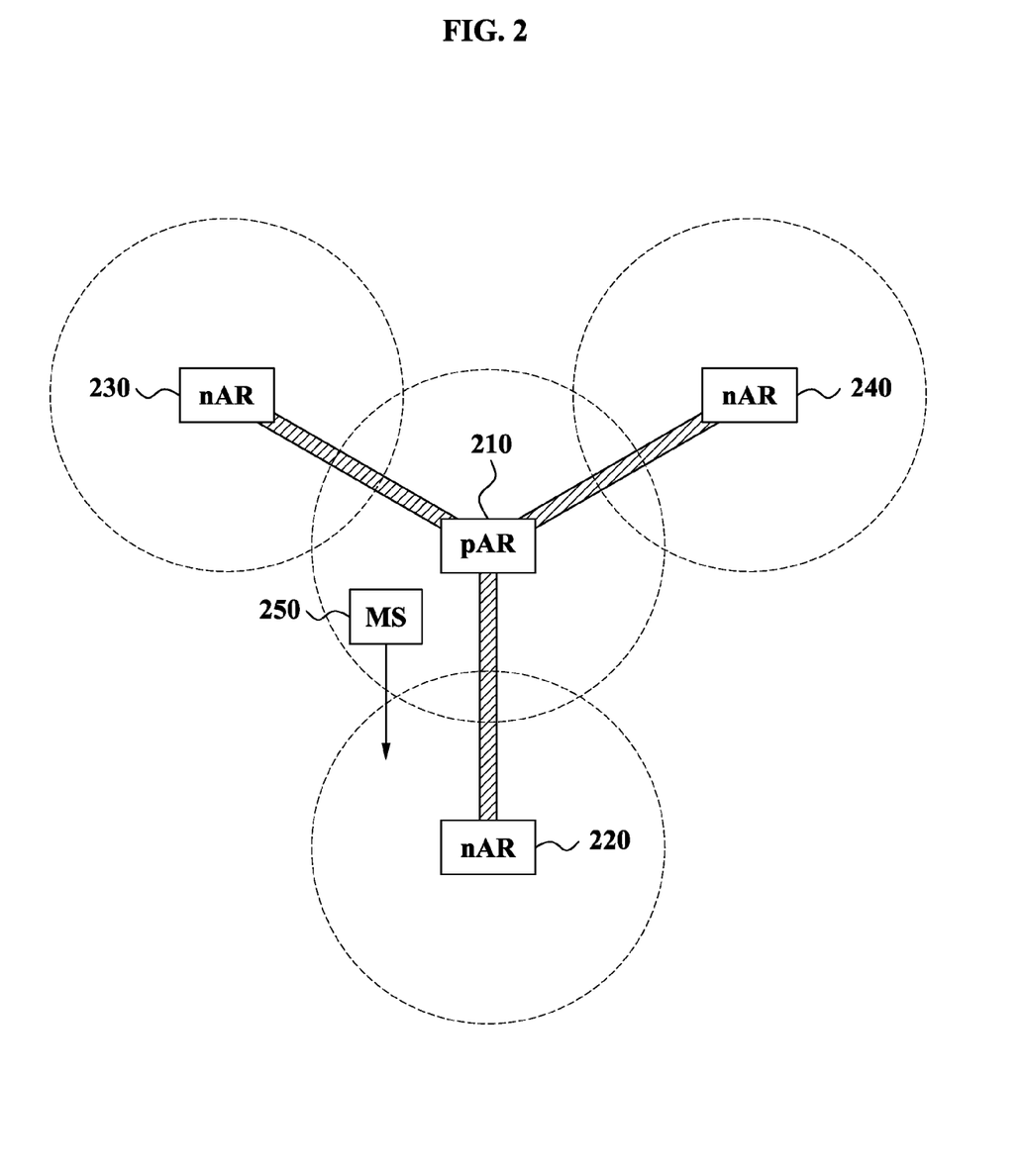
FIG. 2 is a network diagram illustrating a handover according to an exemplary embodiment of the present invention.
Figure 3:
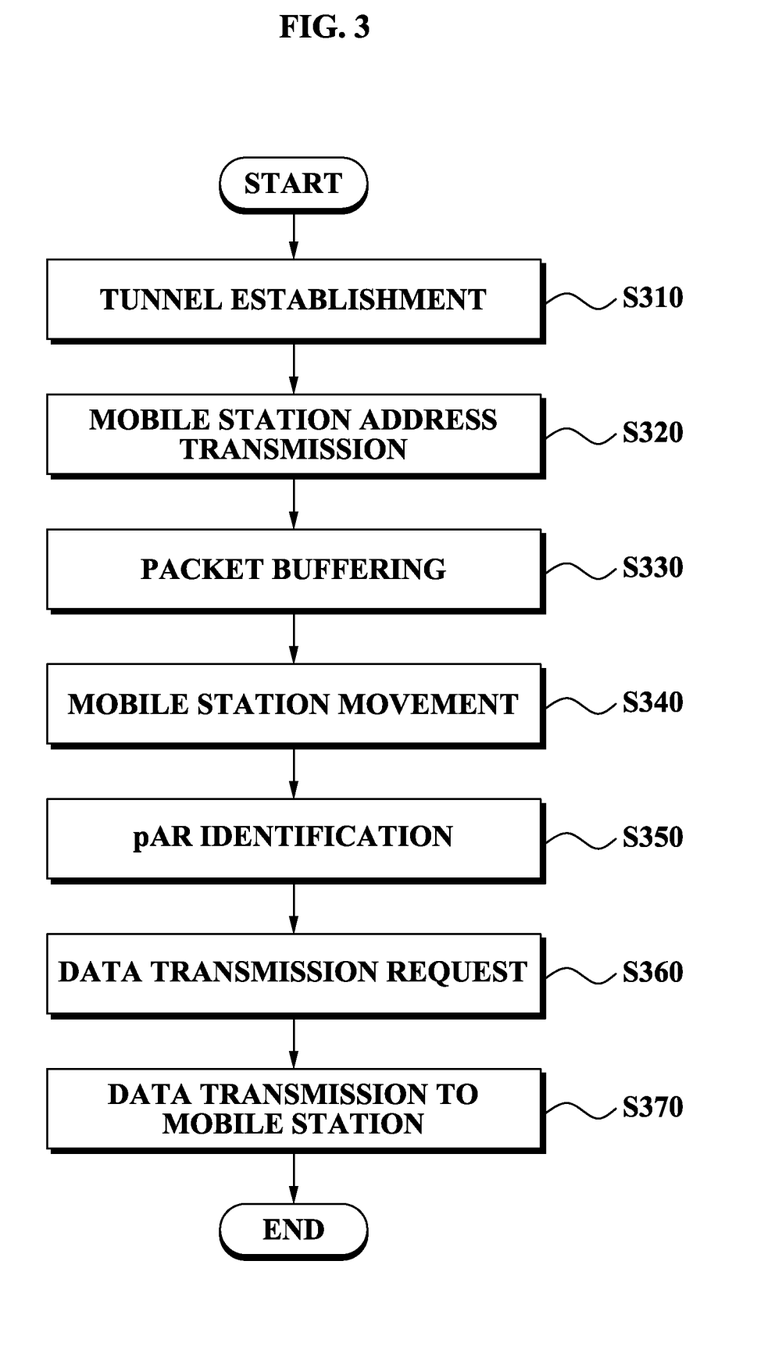
FIG. 3 is a flowchart illustrating a handover procedure according to an exemplary embodiment of the present invention.

FIG. 2 is a network diagram illustrating a handover according to an exemplary embodiment of the present invention. FIG. 3 is a flowchart illustrating a handover procedure according to an exemplary embodiment of the present invention. Hereinafter, the present invention is described in detail with reference to FIGS. 2 and 3.

In FIG. 2, four access routers (210, 220, 230, and 240) and a mobile station (MS) 250 are illustrated. In FIG. 2, the MS 250 moves from a previous access router (pAR) 210 to a new access router (nAR) 220.

In operation S310, to buffer data to be transmitted to the MS 250 during a handover of the MS 250, the pAR 210 establishes a tunnel with at least one other access routers 220, 230, and 240 adjacent to the pAR 210. The establishment of the tunnel is performed by exchanging their addresses between each of the access routers 220, 230, and 240 and the pAR 210. A lightweight tunnel can be used as the tunnel to reduce an overhead.

Hereinafter, two embodiments with respect to a range of the other access routers 220, 230, and 240 where the pAR 210 establishes the tunnel are provided.

According to an exemplary embodiment of the present invention, the pAR 210 establishes a tunnel with the other access routers 220, 230, and 240 adjacent to the pAR 210. A network administrator has information about an establishment location of the access routers 210, 220, 230, and 240, and thus the network administrator has information about the other access routers 220, 230, and 240 adjacent to the pAR 210. The network administrator may enable the pAR 210 to establish the tunnel with the other access routers 220, 230, and 240 by inputting the information about the access routers 220, 230, and 240. Specifically, the information about the access routers 220, 230, and 240 may be previously established in the pAR 210. The access routers 220, 230, and 240 correspond to all access routers which may be a next access router, when the MS 250 which belongs to the pAR 210 moves.

According to another exemplary embodiment of the present invention, the pAR 210 establishes a tunnel with at least one access router. The at least one access router is selected from the access routers 220, 230, and 240 adjacent to the pAR 210, based on a location of the pAR 210. For example, referring to FIG. 2, when the MS 250 is located at a point as illustrated in FIG. 2, the MS 250 may not immediately move to the nAR 240. In this instance, the pAR 210 establishes the tunnel with only the access routers 220 and 230, excluding the nAR 240. When the MS 250 includes a global positioning system (GPS) module, the pAR 210 may ascertain a location of the MS 250 by a reporting of the location of the MS 250 from the MS 250 to the pAR 210, or by another method. Thus, in this manner the number of tunnels established may be reduced.

Hereinafter, two embodiments with respect to a time when the pAR 210 establishes the tunnel with the other access routers are provided.

According to an exemplary embodiment of the present invention, when a determination is made that the MS 250 moves from the pAR 210 to another access router, the pAR 210 establishes a tunnel with at least one access router of the other access routers 220, 230, and 240 adjacent to the pAR 210. Specifically, when a prediction is made that the MS 250 will move to the other access router, the pAR 210 establishes the tunnel. The pAR 210 measures a signal strength from the MS 250. When the signal strength from the MS 250 is less than a predetermined threshold, the pAR 210 may determine that the MS 250 has moved from the pAR 210 to the other access router.

According to another exemplary embodiment of the present invention, the pAR 210 establishes a tunnel regardless of a prediction of a movement of the MS 250. The pAR 210 establishes the tunnel with the at least one access router of the other access routers 220, 230, and 240 adjacent to the pAR 210 at an appropriate point in time. In this instance, the pAR 210 may establish the tunnel with all the access routers 220, 230, and 240. Also, a built-in tunnel provided according to another exemplary embodiment of the present invention may be provided for every mobile station, or shared between mobile stations. When the tunnel is shared between mobile stations, the tunnel established between two access routers is used for a transmission of data buffered for a plurality of mobile stations according to a handover of the plurality of mobile stations.

In operation S320, the pAR 210 transmits an address of the MS 250 to the at least one access router of the other access routers 220, 230, and 240 adjacent to the pAR 210. When the MS 250 moves to the other access router, the other access router may ascertain which access router is buffering the data to be transmitted to the MS 250 through the address of the MS 250. The address of the MS 250 includes at least one of an Internet protocol (IP) address and a media access control (MAC) address of the MS 250. Similarly, in operation S320, the nAR 220 receives an address of each mobile station, which is predicted to move from other surrounding access routers, from the other surrounding access routers.

Specifically, when a prediction is made that the MS 250 moves, the pAR 210 transmits the address of the MS 250 to the at least one access router of the other access routers 220, 230, and 240 adjacent to the pAR 210. The pAR 210 measures the signal strength from the MS 250. When the signal strength from the MS 250 is less than the predetermined threshold, the pAR 210 may predict that the MS 250 moves from the pAR 210 to the other access router.

According to an exemplary embodiment of the present invention, when establishing the tunnel with the at least one access router of the other access routers 220, 230, and 240 adjacent to the pAR 210, the pAR 210 transmits the address of the MS 250 to an access router establishing the tunnel.

Hereinafter, two embodiments are provided with respect to which access routers the pAR 210 will transmit the address of the MS 250 to.

According to an exemplary embodiment of the present invention, the pAR 210 transmits the address of the MS 250 to the at least one access router of the other access routers 220, 230, and 240 adjacent to the pAR 210. Addresses of each of the access routers 220, 230, and 240 may be previously established by the network administrator in the pAR 210. The access routers 220, 230, and 240 correspond to all access routers which may be the subsequent access router, when the MS 250 which belongs to the pAR 210 moves.

According to another exemplary embodiment of the present invention, the pAR 210 transmits the address of the MS 250 to at least one access router. The at least one access router is selected from the access routers 220, 230, and 240 adjacent to the pAR 210, based on the location of the pAR 210. When the MS 250 includes a GPS module, the pAR 210 may ascertain the location of the MS 250 by a reporting of the location of the MS 250 from the MS 250 to the pAR 210, or by another method.

In operation S330, when a determination is made that the MS 250 moves or will move from the pAR 210 to another access router, the pAR 210 buffers the data to be transmitted to the MS 250. When the MS 250 completely belongs to the pAR 210, a packet whose destination is the MS 250 is transmitted to the MS 250 via the pAR 210. However, when the determination is made that the MS 250 moves or will move from the pAR 210 to the other access router, even if the packet for the MS 250 is transmitted to the MS 250, it is not guaranteed that the packet is received by the MS 250. Accordingly, when the determination is made that the MS 250 moves or will move from the pAR 210 to the other access router, the pAR 210 according to the present exemplary embodiment buffers the data to be transmitted to the MS 250. In this instance, the data is data for the MS 250.

As a method of determining that the MS 250 moves or will move from the pAR 210 to the other access router, a method based on the signal strength from the MS 250 exists. Specifically, when the signal strength from the MS 250 is less than the predetermined threshold, the determination is made that the MS 250 moves or will move from the pAR 210 to the other access router, since a low signal strength from the MS 250 indicates that the MS 250 is relatively far away from the pAR 210.

As another method of determining that the MS 250 moves or will move from the pAR 210 to the other access router, a method based on a report from the MS 250 exists. Specifically, when the determination is made that the MS 250 will move to the other access router, the MS 250 reports the determination to the pAR 210 where the MS 250 belongs, or reports information which helps determine that the MS 250 moves or will move from the pAR 210 to the other access router, to the pAR 210. Accordingly, the pAR 210 performs a determination based on the report.

According to an exemplary embodiment of the present invention, when the determination is made that the MS 250 will move from the pAR 210 to the other access router, the pAR 210 buffers the data whose destination is the MS 250 and transmits the data to the MS 250, in response to receiving the data. Although the determination is made that the MS 250 will move from the pAR 210 to the other access router, when the data is transmitted to the MS 250, the MS 250 may receive the data. Accordingly, the data is buffered and transmitted to the MS 250 to transmit the data to the MS 250 more rapidly.

In operation S340, the MS 250 moves from the pAR 210 to the nAR 220. The MS 250 performs a handover from the pAR 210 to the nAR 220. The MS 250 requests the nAR 220 for an authentication. The MS 250 is required to be authenticated from the nAR 220 so that the MS 250 receives a mobile communication service from the nAR 220. The nAR 220 senses a movement of the MS 250 by using the authentication request from the MS 250. For example, the nAR 220 senses the MS 250 which moves to the nAR 220 by using the address of the MS 250 included in the authentication request from the MS 250.

In operation S350, the nAR 220 identifies a previous access router of the MS 250 which moves to the nAR 220. In operation S320, the nAR 220 receives the address of the MS 250 from the pAR 210. Similarly, in operation S320, the nAR 220 receives the address of each mobile station, which is predicted to move from one of the other surrounding access routers, from another one of the other surrounding access routers. The nAR 220 identifies the previous access router of the MS 250 where the movement is sensed, by comparing the address of the MS 250 where the movement to the nAR 220 is sensed, and also identifies the address of each of the mobile stations in operation S320. In this instance, the address of each of the mobile stations is received from the other access routers in operation S320.

For example, in operation S320, the nAR 220 receives a MAC address of the MS 250 from the pAR 210. Also, in operation S340, the nAR 220 obtains the MAC address of the MS 250 where the movement is sensed. Also, in operation S350, the nAR 220 identifies whether the previous access router of the MS 250 where the movement is sensed is the pAR 210, by comparing the MAC address of the MS 250 where the movement is sensed and the MAC address of the MS 250 received from the pAR 210.

In operation S360, the nAR 220 requests the buffered data from the pAR 210, which is identified as the previous access router of the MS 250 where the movement is sensed. In this instance, the buffered data is the data for the MS 250. When sensing the movement of the MS 250, the nAR 220 requests an access router for the buffered data. The access router is identified as the previous access router of the MS 250. The request includes the address of the MS 250. The address of the MS 250 includes an IP address of the MS 250.

When receiving the transmission request of the buffered data to be transmitted to the MS 250 from the nAR 220, the pAR 210 transmits the buffered data to the nAR 220. The pAR 210 transmits the buffered data to the nAR 220 using the tunnel established with the nAR 220 in operation S310. For example, a destination address of a buffered packet to be transmitted to the MS 250 may be the address of the MS 250, and a source address may be an address of a corresponding node. The pAR 210 includes the packet as a payload, and encapsulates the destination address as the nAR 220 and the source address as the pAR 210. Accordingly, the pAR 210 generates a new packet and transmits the generated packet to the nAR 220.

According to an exemplary embodiment of the present invention, when receiving the transmission request for the buffered data to be transmitted to the MS 250 from the nAR 220, the pAR 210 terminates the tunnel with the at least one access router, excluding the nAR 220.

According to another exemplary embodiment of the present invention, a lifetime with respect to the tunnel is established, such that the tunnel is terminated after the lifetime expires.

In operation S370, when receiving the buffered data from the pAR 210, the nAR 220 transmits the data to the MS 250. The buffered data is data for the MS 250 which performs a handover to the nAR 220. The nAR 220 decapsulates the encapsulated packet, restores the original packet, and transmits the packet to the MS 250 using a host specific routing using the MAC address of the MS 250.

According to the present exemplary embodiment, when the movement of the MS 250 is predicted, the pAR 210 buffers the data to be transmitted to the MS 250, and after the MS performs a handover to the nAR 220, the buffered data is transmitted from the pAR 210 to the nAR 220. Also, the nAR 220 transmits the data received from the pAR 210 to the MS 250. Through this, during the handover of the MS 250, the data to be transmitted to the MS 250 is transmitted to the MS 250 without a loss of data.

Figure 4:
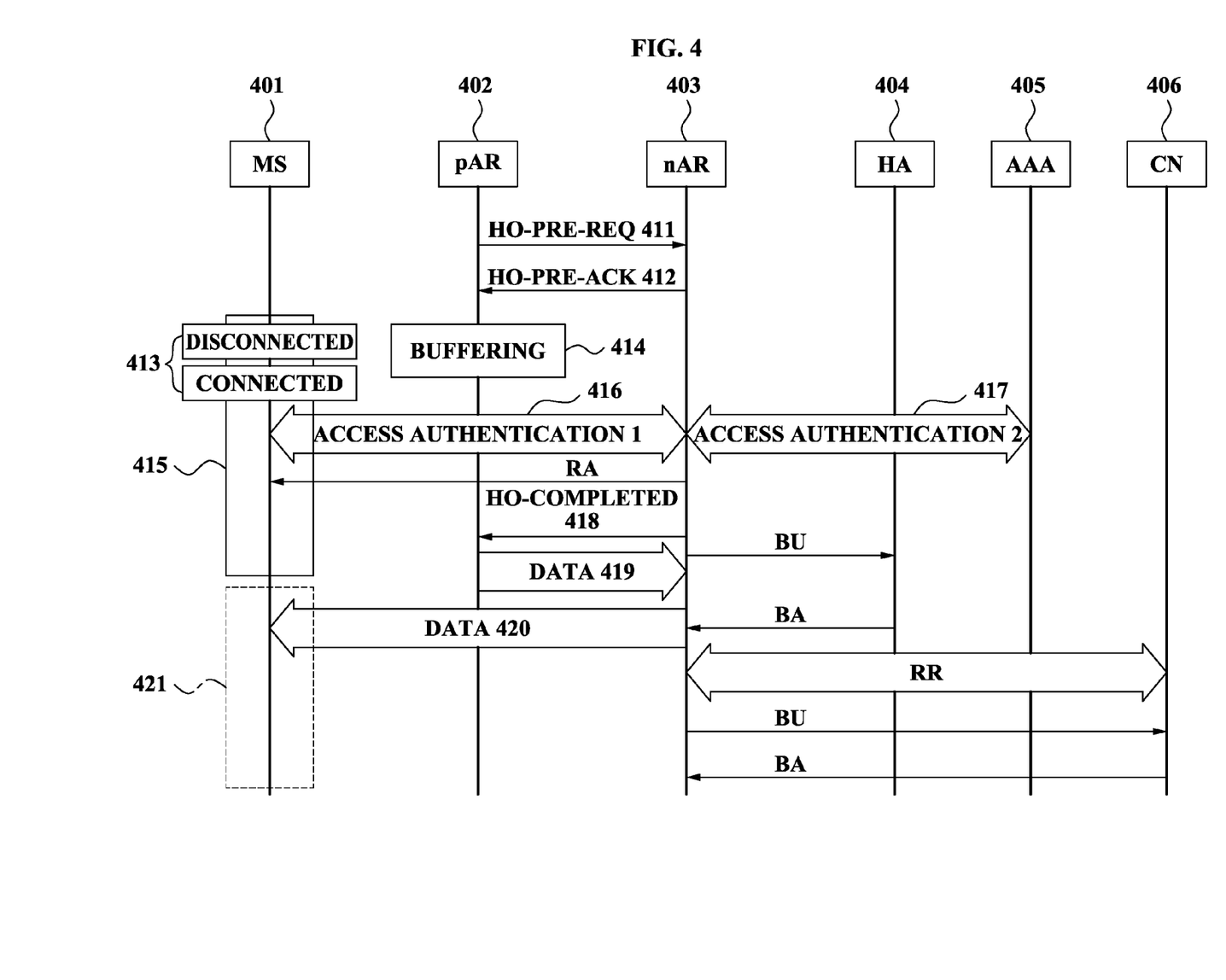
FIG. 4 is a diagram illustrating an example of using a handover in PMIPv6 according to an exemplary embodiment of the present invention.

FIG. 4 is a diagram illustrating an example of using a handover in Proxy Mobile Internet Protocol version 6 (PMIPv6) according to an exemplary embodiment of the present invention.

To buffer data to be transmitted a MS 401 during a handover of the MS 401, a pAR 402 establishes a tunnel with at least one other access router (nAR) 403 adjacent to the pAR 402. The establishment of the tunnel is performed by the nAR 403 and the pAR 402 exchanging their own addresses with each other. The pAR 402 and the nAR 403 establish the tunnel by exchanging a HO-PRE-REQ message 411 and a HO-PRE-ACK message 412. End points of the tunnel are IP addresses of each of the pAR 402 and the nAR 403. The HO-PRE-REQ message 411 includes an IP address and a MAC address of the MS 401 which is predicted to move.

When a determination is made that the MS 401 moves or will move from the pAR 402 to another access router, the pAR 402 buffers the data to be transmitted to the MS 401 in operation 414.

The MS 401 moves from the pAR 402 to the nAR 403 in operation 413. When the MS 401 requests the nAR 403 for an authentication, an authentication with respect to the MS 401 is performed via the nAR 403 in operation 416, and an authentication, authorization, and accounting (AAA) server 405 in operation 417.

When sensing that the MS 401 moves to the nAR 403, the nAR 403 identifies a previous access router of the MS 401 by comparing a MAC address of the MS 401 and a MAC address, received from the pAR 402, of the MS 401. Also, the nAR 403 transmits a HO-Completed message 418 to the identified access router, i.e. pAR 402. The HO-Completed message 418 includes an identifier, e.g. an IP address, of the MS 401 which newly moves to the nAR 403.

For the handover of the MS 401, the nAR 403 transmits a binding update (BU) message to a home agent (HA) 404, and receives a binding acknowledgement (BA) message from the HA 404. Also, the nAR 403 exchanges a return routability (RR) message with a correspondent node (CN) 406.

The pAR 402 receiving the HO-Completed message 418 identifies data whose destination is the MS 401, from among the data buffered, by referring to the identifier of the MS 401. The identifier of the MS 401 is included in the HO-Completed message 418. The pAR 402 transmits the identified data to the nAR 403 in operation 419. The nAR 403 transmits the received data to the MS 401 in operation 420.

According to an exemplary embodiment, during a period 415, the data whose destination is the MS 401 is transmitted to the MS 401 without a loss of data. Also, the latency of the handover is reduced by as much as a period 421 in comparison to a conventional art.

Although the above-described exemplary embodiments of the present invention are described based on a PMIPv6 environment, the present invention is not limited to the PMIPv6 environment. Also, the present invention may be applied to a variety of mobile communication environments such as a client mobile IP (CMIP), a fast mobile IPv6 (FMIPv6), and the like.

The above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, an access router and a method of processing a handover by the access router are provided which buffer data whose destination is a mobile station in a pAR during a handover of the mobile station, and when the handover of the mobile station is completed, transmit the data to the mobile station, and thereby may reduce a loss of the data whose destination is the mobile station during the handover of the mobile station.

Thus, according to the present invention, the latency of the handover is reduced, and a fast handover may be performed.

Also, according to the present invention, an access router is provided, and a method of processing a handover by the access router is provided which may be performed by only the access router without a mobile station's participation in operations according to the present invention, and thereby may support a seamless handover with respect to the mobile station by exchanging only the access router in a communication environment which uses a mobile station in a conventional art.

Also, according to the present invention, an access router and a method of processing a handover by the access router are provided which do not require an accurate prediction of which access router a mobile station moves to, in order to accurately transmit data whose destination is the mobile station to the mobile station, and thereby may be performed robustly. In a fast mobile IPv6 (FMIPv6), which is defined in RFC 4068, a pAR predicts an nAR where the mobile station will move, and transmits the data whose destination is the mobile station to the predicted nAR. In this instance, when the prediction is not correct, a loss of data may be caused during the handover. However, the disadvantage described above may be overcome according to the present invention. A prediction of whether the movement is performed is much simpler than a prediction of the movement's direction. The present invention brings about a reliable result with only the prediction of whether the movement is performed, whereas an accurate prediction of movement direction is significant in FMIPv6. Also, the present invention does not require the prediction of movement direction.

Particularly, according to the present invention, an access router and a method of processing a handover by the access router are provided which do not require a message such as a Router Solicitation for Proxy Advertisement (RtSolPr) scheme, a Proxy Router Advertisement (PrRtAdv) scheme, a Fast Binding Update (FBU) scheme, a Feedback Acknowledgement (FBAck) scheme, and the like, as opposed to a FMIPv6, may be simply embodied, and thereby may reduce the rate of malfunctions.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A non-transitory computer readable medium stored in a first access router configured to perform a method comprising:

buffering first data to be transmitted to a first mobile station, and transmitting the first data to a second access router after receiving a handoff complete message from the second access router comprising an identifier for the mobile station;

wherein when a signal strength from the first mobile station is less than a predetermined threshold, the first access router determines that the first mobile station will move, transmits an address of the first mobile station to at least one adjacent access router which is adjacent to the first access router after it is determined that the first mobile station will move, and buffers the first data;

wherein the first access router does not establish a tunnel with an adjacent access router until the first access router determines that the first mobile station will move;

wherein the first access router buffers the first data before the second access router is known, and wherein the second access router identifies the first access router by comparing the address of the first mobile station transmitted by the first access router, with an address of the first mobile station obtained where movement of the first mobile station is sensed.

2. The non-transitory computer readable medium of claim 1, wherein the first access router establishes a tunnel with all adjacent access routers adjacent to the first access router.

3. The non-transitory computer readable medium of claim 1, wherein the access router establishes a tunnel with at least one access router which is selected from among adjacent access routers adjacent to the first access router, based on a location of the first mobile station.

4. The non-transitory computer readable medium of claim 1, wherein, if a transmission request for the first data is received from the second access router, the first access router terminates the tunnel with the at least one adjacent access router excluding the second access router.

5. The non-transitory computer readable medium of claim 1, wherein the first access router establishes a lifetime with respect to the tunnel, and, after the tunnel is established, terminates the tunnel after the lifetime.

6. The non-transitory computer readable medium of claim 1, wherein the first access router buffers the first data to be transmitted to the first mobile station, based on a report from the first mobile station.

7. The non-transitory computer readable medium of claim 1, wherein the first access router buffers the first data and transmits the first data to the first mobile station in response to receiving the first data to be transmitted to the first mobile station.

8. The non-transitory computer readable medium of claim 1, wherein the first access router transmits the first data to the second access router, if a transmission request for the first data is received from the second access router.

9. The non-transitory computer readable medium of claim 8, wherein the transmission request for the first data includes an address of the first mobile station.

10. The non-transitory computer readable medium of claim 1, wherein, if second data for a second mobile station is received from a third access router which is buffering the second data and performing a handover to the access router, the first access router transmits the second data to a second mobile station.

11. The non-transitory computer readable medium of claim 10, wherein the first access router receives an address of a third mobile station from the third access router.

12. The non-transitory computer readable medium of claim 11, wherein the address of the third mobile station includes at least one of an Internet protocol (IP) address and a media access control (MAC) address of the third mobile station.

13. The non-transitory computer readable medium of claim 11, wherein the first access router identifies the third access router based on an address of the second mobile station and the address of the third mobile station.

14. The non-transitory computer readable medium of claim 13, wherein the address of the second mobile station is a MAC address of the second mobile station, and the address of the third mobile station is a MAC address of the third mobile station.

15. The non-transitory computer readable medium of claim 13, wherein the first access router requests the second data for the second mobile station, buffered in the third access router, from the identified third access router.

16. The non-transitory computer readable medium of claim 15, wherein, if a movement of the second mobile station is sensed, first the access router requests the second data from the identified third access router.

17. The non-transitory computer readable medium of claim 15, wherein the first access router senses a movement of the second mobile station using an authentication request from the second mobile station.

18. The non-transitory computer readable medium of claim 1, wherein the first access router utilizes the identifier to identify, from the buffered first data, data to be sent to the second access router for transmission to the mobile station.

19. A method for a first access router to perform a handover of a mobile station to a second access router, the method comprising:
buffering first data to be transmitted to the first mobile station; and
transmitting the first data to the second access router after receiving a handoff complete message from the second access router comprising an identifier for the mobile station;
wherein when a signal strength from the first mobile station is less than a predetermined threshold, the first access router determines that the first mobile station will move, transmits an address of the first mobile station to at least one adjacent access router which is adjacent to the access router after it is determined that the first mobile station will move, and the module of the first access router buffers the data;
wherein the access router does not establish a tunnel with the second access router until the first access router determines that the first mobile station will move;
wherein the buffering the first data is initiated before the second access router is known, and
wherein the second access router identifies the first access router by comparing the address of the first mobile station transmitted by the first access router, with an address of the first mobile station obtained where movement of the first mobile station is sensed.

20. The method of claim 19, wherein when the first access router determines that the first mobile station will move, receiving a report from the mobile station comprising a location of the mobile station, and selecting an adjacent router as the second router based on the report.

* * * * *

UNITED STATES PATENT AND TRADEMARK OFFICE
CERTIFICATE OF CORRECTION

| | | |
|---|---|---|
| PATENT NO. | : 8,588,183 B2 | Page 1 of 1 |
| APPLICATION NO. | : 11/935613 | |
| DATED | : November 19, 2013 | |
| INVENTOR(S) | : Jang et al. | |

It is certified that error appears in the above-identified patent and that said Letters Patent is hereby corrected as shown below:

On the Title page, Item [75] after the first listed Inventor,

Insert -- [75] Inventor: Byoung-Joon LEE, Seongnam-si (KR) --

Signed and Sealed this
Twenty-seventh Day of May, 2014

Michelle K. Lee
*Deputy Director of the United States Patent and Trademark Office*